United States Patent [19]

Hillman

[11] 4,088,036
[45] May 9, 1978

[54] POWER DRIVE TRANSMISSION ASSEMBLY

[75] Inventor: Darrel D. Hillman, Santa Ana, Calif.

[73] Assignee: Electromatic Drive Corporation, Fort Worth, Tex.

[21] Appl. No.: 629,090

[22] Filed: Nov. 5, 1975

[51] Int. Cl.² .................. F16H 55/56; G01P 3/36; F16H 9/18
[52] U.S. Cl. .................. 74/230.17 A; 74/230.17 M; 324/175
[58] Field of Search ............... 74/230.17 A, 230.17 R, 74/230.17 C, 230.17 M, 337, 217 R, 217 CV, 336; 340/263, 267 R, 271; 324/163, 166, 175, 161; 317/5

[56] References Cited

U.S. PATENT DOCUMENTS

| | | | |
|---|---|---|---|
| 3,117,461 | 1/1964 | Fermier | 74/230.17 C |
| 3,146,432 | 8/1964 | Johnson | 324/175 |
| 3,491,608 | 1/1970 | Trofimov | 74/230.17 C |
| 3,560,854 | 2/1971 | Moss et al. | 324/161 |
| 3,954,018 | 5/1976 | O'Berto | 74/230.17 A |

*Primary Examiner*—Samuel Scott
*Assistant Examiner*—Allan R. Burke

[57] ABSTRACT

A power driven transmission assembly for an internal combustion engine, which assembly includes an endless V-belt that extends between a driving and a driven pulley. The driven pulley is subject to varying loads. The driving and driven pulleys each include first half portions which are transversely movable relative to the first half portions. By concurrently moving the second half portions relative to the first half portions, the effective pitch diameters of the driving and driven pulleys relative to the belt is varied for the transmission assembly to automatically deliver rotational power that in magnitude is related to a desired degree to the torque curve or torque capability of the prime mover with which the invention is associated. The effective pitch diameter ratio of the pulley system is changed by varying the pitch diameter of the driving pulley by power means. The power means is energized and is responsive to an electro mechanical servomechanism that senses the rate of rotation of the driving pulley and the lateral position of the second portion thereof relative to the first portion. By comparing the two signals, the second pulley portion of the driving pulley is moved laterally to a position where the driven pulley is delivering rotational power at a desired relationship to the torque curve of the engine. Radial balance is maintained throughout the shifting pattern as the effective pitch diameters of the driving and driven pulleys changes, for there is no radially moving parts in the present invention.

27 Claims, 17 Drawing Figures

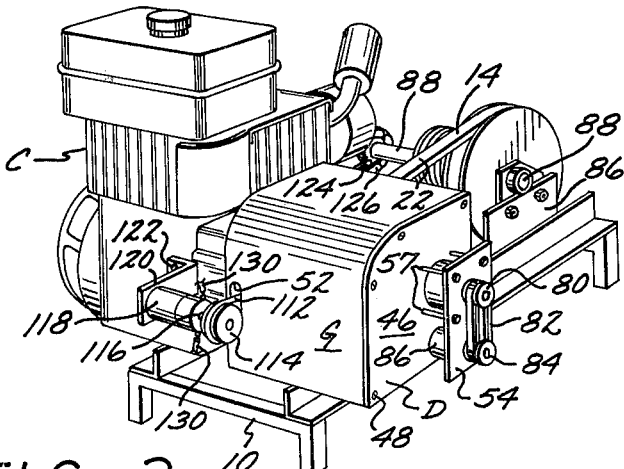
FIG.1
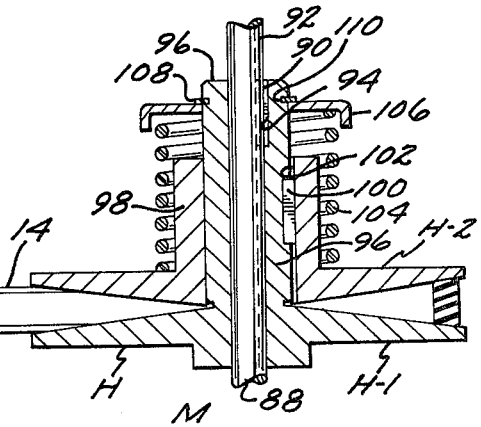
FIG.5
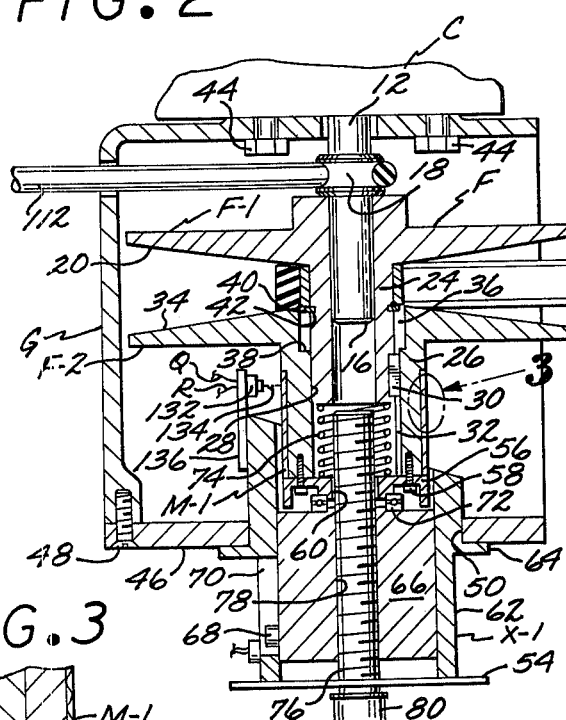
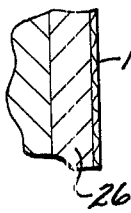
FIG.3
FIG.2
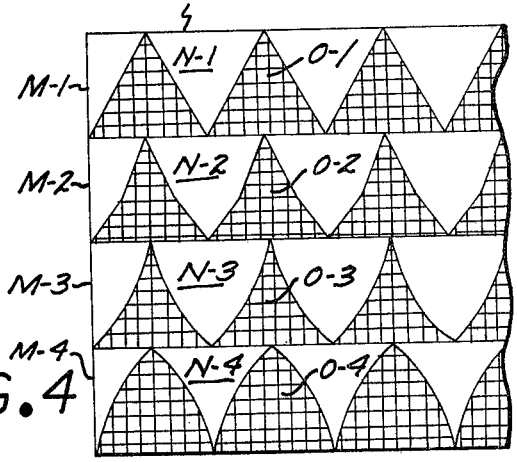
FIG.4
FIG.6

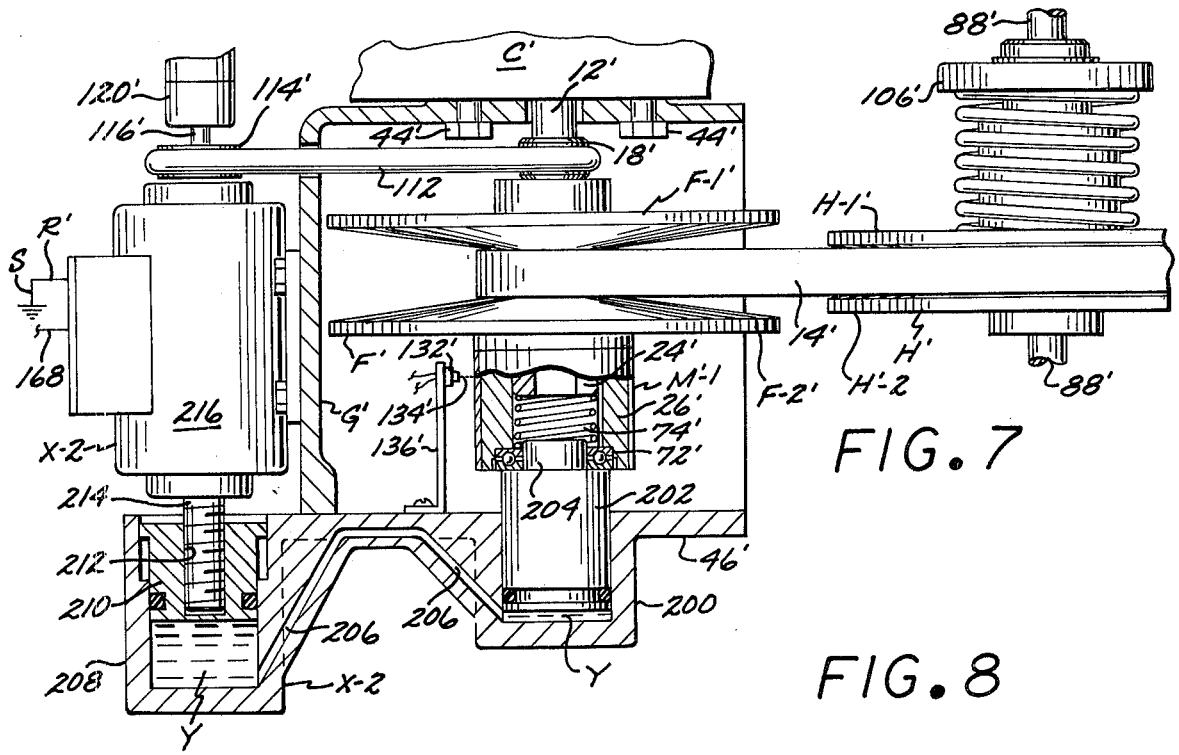
FIG. 7
FIG. 8
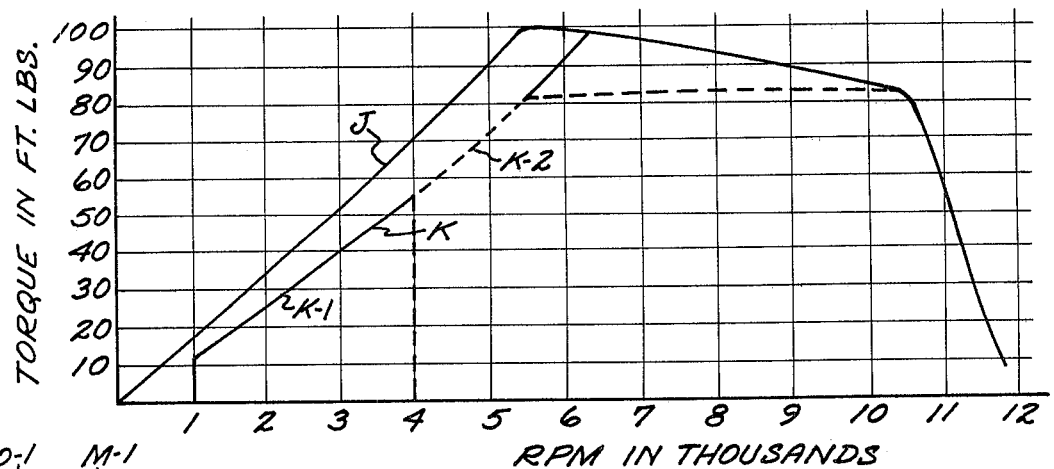
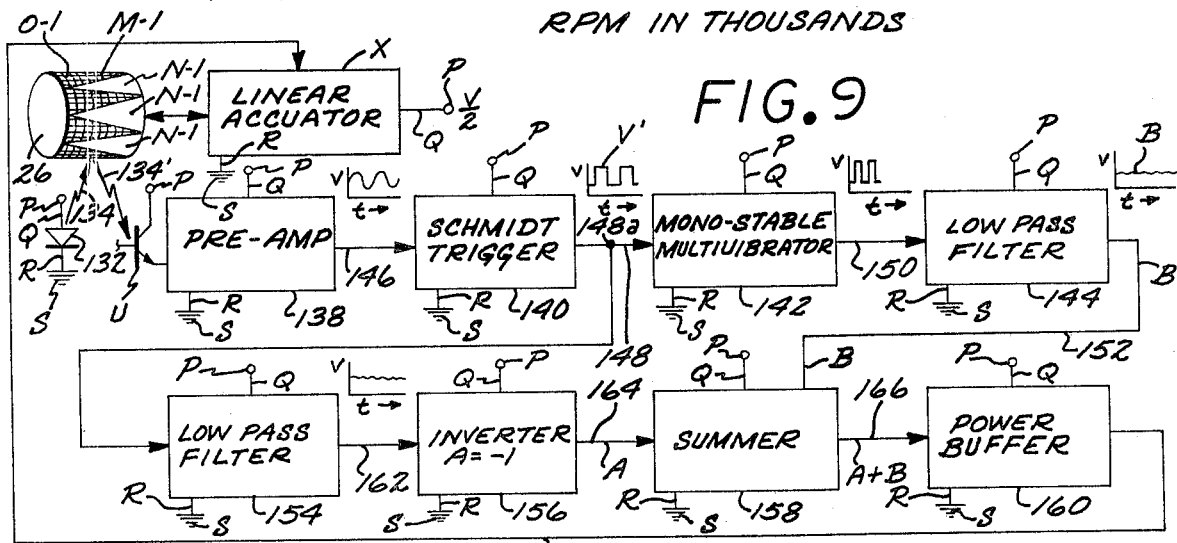
FIG. 9

POWER DRIVE TRANSMISSION ASSEMBLY

BACKGROUND OF THE INVENTION

1. Field of the Invention

Power drive transmission assembly.

2. Description of the Prior Art

In the past, various power operated assemblies have been proposed and used in an attempt to automatically control the pitch diameter ratios of a driving and driven pulley connected by a V-belt in accordance with the rate of rotation imposed on one of the pulleys. Such prior art devices have, in the main, utilized centrifugal means to attempt to accomplish this result, but such centrifugal means are effective in but a limited range, and have the disadvantage that they impart a radial imbalance to the system.

The primary purpose in devising the present invention is to supply a power drive transmission assembly which can be automatically or manually controlled to provide a desired pitch diameter ratio to the driving and driven pulleys engaged by an endless V-belt. This ratio is achieved by varying the pitch diameter of the driving pulley only, and the pitch diameter of the driven pulley automatically varying in accordance therewith due to the spring loaded structure of the driven pulley. The change of the effective pitch diameter of the driving pulley only is accomplished by moving a second portion thereof relative to a first portion, which increases or decreases the pitch diameter of the driving pulley. The pitch diameter of the driven pulley is also controlled by the belt tension, and the magnitude of the spring loading on the second half portion of the driven pulley.

A major object of the present invention is to provide a power transmission assembly for a prime mover, such as an internal combustion engine, which assembly may be so adjusted that a driving pulley, driven pulley and connecting V-belt that form a part thereof are so controlled and so cooperate with power means and a sensing device that detect both the rate of rotation and the lateral position of a second movable half portion of the driving pulley relative to a half portion that rotates in a fixed position on the driving shaft, that the power means is energized to vary the lateral spacing between the first and second half portions of the driving pulley that a desired pitch diameter ratio is achieved between the driving and driven pulleys. As the lateral spacing between the first and second half portions of the driving pulley is varied, the tension on the V-belt is increased or decreased, and the effective diameter of the driven pulley is varied by laterally moving a second spring loaded second portion thereof relative to a first portion of the driven pulley that is rigidly secured to the driven shaft, with the ratio between the pitch diameter of the driving and driven pulleys when the invention is operating at all times has a desired relationship to the torque curve of the prime mover.

Another object of the invention is to supply a power transmission assembly that when in operation effects an infinite number of variations in the effective pitch diameter ratio of the driving and driven pulleys without loss of power, is at all times in radial balance, requires no radially movable parts or weights and in effect uniformly shifting the pitch diameter ratio of the driving and driven pulleys without being dependent on the rate of rotation of the driving pulley.

A further object of the invention is to supply a power transmission assembly that is easily and conveniently adjusted to a particular torque curve of a particular engine or prime mover, and when so adjusted will continue to automatically have a desired relationship to the torque curve of the engine as the driven pulley is subjected to varying loads.

Another object of the present invention is to supply a power drive transmission that has a broad capability to accept a wide variation of engine drive speeds, horse power, and torque output, and permit greater efficiency to be obtained from the engine inasmuch as the power drive assembly does not require the capability to sense torque being applied to the driven pulley.

Yet another object of the invention is to furnish a power transmission assembly that permits upward and downward shifting of the pitch diameter ratios of the driving and driven pulleys without the driving force being disengaged therefrom.

SUMMARY OF THE INVENTION

The power drive transmission assembly is used in conjunction with a prime mover, such as an internal combustion engine or electric motor, that has a known torque curve. The engine is provided with a driving pulley that includes a first half portion that rotates in a fixed position relative to the drive shaft of the engine. The driving pulley includes a second half portion that may move laterally to the first half portion on the driven shaft. Power means are provided that effect controlled lateral movement of the second half portion of the driving pulley relative to the first half portion thereof.

The driving pulley is engaged by an endless V-belt, which belt also engages a driven pulley that is subject to a load of varying magnitude. The driven pulley includes a first half portion that rotates in a fixed position on the driven shaft, and a second half portion that is spring loaded and at all times tends to move toward the first half portion of the driven pulley.

The power driven transmission assembly includes an endless rotatable surface that rotates with the driving pulley. The endless surface has a sequence of spaced light reflecting surfaces of generally triangular shape thereon that are constantly scanned by a photoelectric device. The light reflecting surfaces are of such shape that when scanned by the photoelectric device first and second electric signals are generated that in magnitude are related to the rate at which the driving pulley rotates and the position of the second half portion of the pulley.

The first and second signals are continuously compared by electronic means that at all times tend to maintain them in balance by actuating the power means to move the second portion of the driving pulley laterally relative to the first half portions thereof. Such movement of the second half portion of the driving pulley changes the effective pitch diameter of the driving pulley, and the magnitude of the tension exerted on the belt. This change in tension on the belt results in the effective pitch diameter of the driven pulley changing due to variation in the lateral force imposed on the spring loaded second half portion of the driven pulley. Thus, the power drive transmission assembly constantly changes the ratio of the effective pitch diameters of the driving and driven pulleys to maintain the first and second electric signals in balance. The spacing and configuration of the light reflecting surfaces is so chosen that the first and second signals are in balance when the engine is operating to produce torque on the driven pulley that has a desired relationship to the torque curve. The light reflecting surfaces will normally be so chosen that the first and second signals are in balance when the engine is producing less than the maximum torque possible through the driving pulley, for otherwise it would not be possible to accelerate the engine to drive the driving pulley at a greater rate of rotation.

The power drive transmission assembly of the present invention has the advantages over prior art devices of this nature in that the invention provides:

1. Greater variation in effective pitch diameter ratios between the driving and driven pulleys;
2. Broader capability of accepting wide variations of engine drive speed, horsepower and torque output;
3. Greater efficiency in that the invention does not require the capability to sense torque applied to the driven shaft;
4. Automatic or manual up or down shifting of the effective pitch diameter ratios without disengaging the drive force;
5. Is at all times in balance in that there is no radially movable parts.
6. Can be made to follow an electronically generated shifting pattern.

In another embodiment the objects of the present invention are accomplished with the unique combination similar to that previously described. In the second embodiment the lateral movement of the second half portion of the driving pulley relative to the first half portion is fixed by a manual control acting together with a feedback loop. The feedback loop comprises a load sensor which senses the load on the prime mover and a automatic voltage level setting circuit. The automatic voltage level setting circuit is coupled between the manual control and the power means that move the second half portion of the driving pulley. The output of the load sensor is coupled to an input of the voltage limiting circuit such that the maximum level of the voltage applied to the power means is fixed by the load sensor.

In the second embodiment the prime mover rotates at a constant rotational speed and the effective pitch diameter ratio between the driving and driven pulleys is primarily set by the manual control. Accordingly, even though the prime mover is operating at a constant rotational speed, the output rotational speed from the transmission assembly may increase or decrease in response to the manual control so long as the load on the prime mover does not exceed some predetermined set level. If the load on the prime mover exceeds the set level, the voltage limiting circuit will reduce the voltage applied to the power means in response to the output of the load sensor to reduce the effective pitch diameter ratio between the driving and driven pulleys thereby preventing the load on the prime mover from exceeding the predetermined maximum load set by the load sensor.

In another embodiment of the present invention, the objects are accomplished by a unique combination similar to that previously described except that the driving pulley and driven pulley are interchanged in position. In other words, the driving pulley is utilized as the driven pulley and the driven pulley is utilized as the driving pulley. In the third embodiment, the prime mover is of the type whose rotational speed varies over wide ranges and it is desirable that the output of the power transmission be a constant rotational speed. In this embodiment the position of the second half portion of the driving pulley is controlled by a feedback loop. The feedback loop comprises a sensor which senses the rotational speed of the driven pulley and supplies an output to a comparator means which compares the output of the speed sensor with some reference signal which is related to the desired rotational speed of the driven pulley. The comparator circuit generates a signal to vary the effective pitch diameter ratio between the driving and driven pulley which is applied to the power means on the driven pulley so that the output signal from the speed sensor is equal to the reference signal.

BRIEF DESCRIPTION OF THE DRAWINGS

The above-mentioned and other features and objects of the present invention will become more apparent by reference to the following description taken in conjunction with the accompanying drawings, wherein like reference numerals denote like elements, and in which:

FIG. 1 is a perspective view of an internal combustion engine in driving arrangement with the power drive transmission assembly.

FIG. 2 is a longitudinal cross sectional view of a power drive transmission assembly.

FIG. 3 is a fragmentary cross sectional view of a portion of the assembly within the oval defined by phantom line in FIG. 2 and identified by the numeral 3, and illustrating the positioning of the patterned light reflecting surface on a part of the driving pulley.

FIG. 4 is a top plan view of a sheet having patterned light reflecting strips defined thereon, with each strip being adapted for use on the assembly to achieve a particular power output that is related to the torque curve of the engine.

FIG. 5 in diagram form illustrates in conjunction with an endless V-belt the effective pitch diameter ratios that may be achieved between a driving and driven pulley.

FIG. 6 is a top plan view illustrating the lateral shifting of portions of the driving and driven pulleys.

FIG. 7 is a simplified top plan view of a second form of the invention.

FIG. 8 discloses plotted curves that illustrate the power output of the invention relative to the torque curve.

FIG. 9 is a diagram illustrating the electrical circuit used on the invention.

DESCRIPTION OF THE PREFERRED EMBODIMENT

Figure 10:
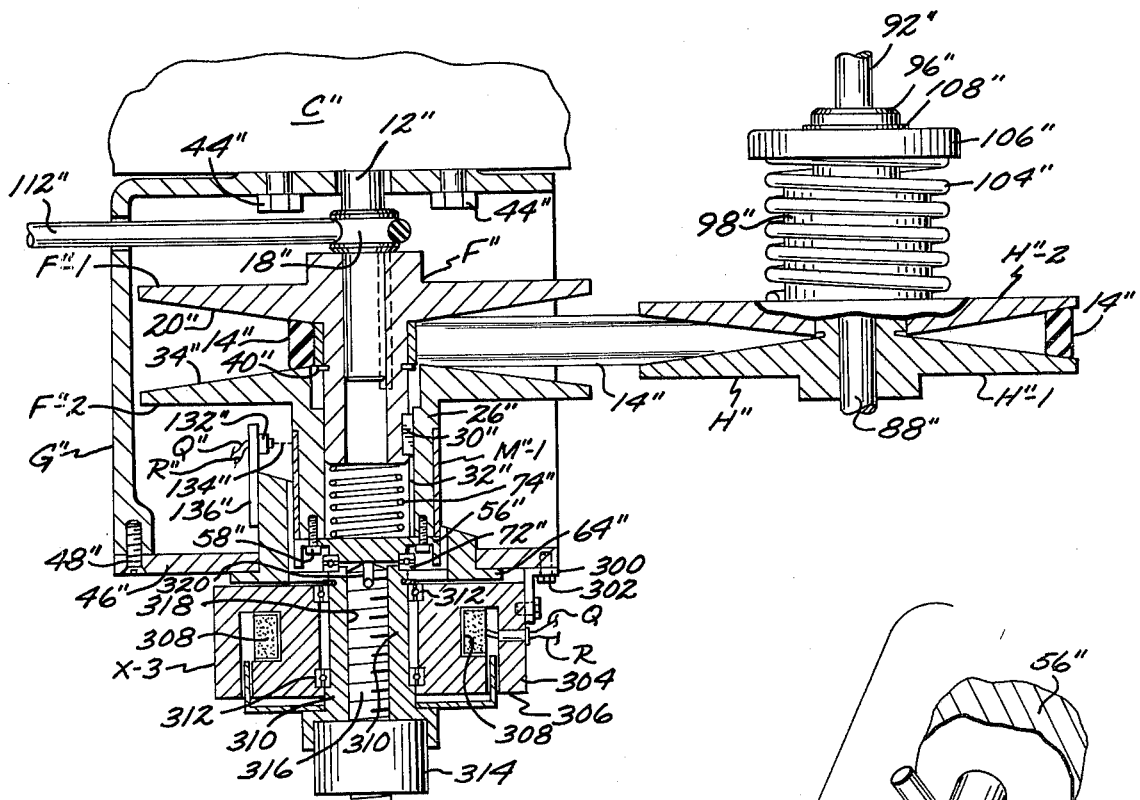
FIG. 10 is a top plan view of a third form of the invention.

This application is a continuation in part of application for United States letters patent Ser. No. 525,450 filed Nov. 20, 1974.

An internal combustion engine C has a first form of power drive transmission assembly D operatively associated therewith as shown in FIG. 1. Engine C and assembly D are illustrated in FIG. 1 as supported on a base frame 10, which when the invention is used may be a part of a vehicle chassis not shown.

Engine C as illustrated in FIG. 1 includes a drive shaft. In FIG. 2 a drive shaft 12 is illustrated that has a driving pulley F mounted thereon, and this pulley is capable of driving an endless V-belt 14. Driving pulley F is of split structure and includes a first half F-1 that is by a key 16 rigidly secured to drive shaft 12. Drive shaft 12 has a first grooved wheel 18 rigidly secured thereto. The first pulley half F-1 is formed with an outwardly tapering interior first face 20 as may best be seen in FIG. 2. Belt 14 has oppositely disposed side walls 22 that taper inwardly toward one another at substantially the same angle as that of the first face 20.

First pulley half F-1 as shown in FIG. 2 includes a cylindrical first hub 24, with the first hub extending outwardly away from the first surface 20. First pulley F also includes a second half F-2, which second half includes a second cylindrical hub 26 in which a longitudinal bore 28 is formed. The bore 28 is slidably engaged by first hub 24. A key 30 is secured to first hub 24 and slidably engages an interior groove 32 in second hub 26 to prevent the first and second pulley halves F-1 and F-2 rotating relative to one another as shown in FIG. 2. First half F-2 has an outwardly tapering interior face 34, that tapers at substantially the same angle as one of the belt side walls 22. The first and second faces 20 and 34 taper outwardly away from one another as shown in FIG. 2. Bore 28 on the inner end thereof develops into a recess 36 that is partially defined by a ring shaped body shoulder 38. A snap ring 40 is mounted in a circumferentiallly extending groove 42 formed on the outer surface of first hub 24. The snap ring 42 serves as a stop when contacted by body shoulder 42 to limit the inward movement of second pulley half F-2 relative to first half F-1. It should be understood that the assembly of FIG. 2 may be employed with an assembly such as shown in FIG. 1 or other assemblies. The common numbering and lettering between FIGS. 1 and 2 is only suggestive of one possible form of cooperation.

A housing G is secured to engine C by bolts 44 or other suitable fastening means. Housing G has an outwardly disposed open end that is normally closed by a first plate 46 that is removably secured thereto by bolts 48. First plate 46 has an opening 50 therein. A slot 52 is formed in the side of housing G as shown in FIG. 1. A second plate 54 is provided that is disposed outwardly from first plate 46 and is removably secured thereto by screws 57.

Returning to FIG. 2, the outer end of a second hub 26 has a circular member 56 secured thereto by screws 58. A bore 60 is formed in the center of member 56. A rigid cylindrical shell 62 having an outwardly extending flange 64 engages opening 50 and is gripped between first and second plates 46 and 54 when screws 57 are tightened as shown in FIG. 1. A block 66 is slidably supported in cylinder 62, with the block having a pin 68 that extends outwardly therefrom to slidably engage a longitudinal slot 70 formed in the shell. A ball bearing assembly 72 is disposed between member 56 and block 66. In FIG. 2 it will be seen that a compressed helical spring 74 is disposed in the open portion of the bore 28 and is in abutting contact with second pulley half F-2 and member 56. Spring 74 at all times tends to move second pulley half F-2 away from first pulley half F-1.

A threaded rod 76 is rotatably supported in a fixed longitudinal position in second plate 54 as shown in FIG. 2, and rotatably engages a tapped bore 78 formed in block 66. A grooved wheel 80 is secured to the outwardly projecting end of rod 76 to permit the rotation thereof. Rotation of the rod 76 moves block 66, ring shaped member 56, ball bearing assembly 72 and second pulley half F-2 as a unit toward or away from first pulley half F-1 dependent upon the direction of rotation of the rod 76.

An endless belt 82 as may be seen in FIG. 1 engages grooved wheel 80, with the belt extending to a grooved wheel 84 on the drive shaft of a reversible electric motor 86, which motor is supported in a fixed position relative to housing G by conventional means (not shown). The motor 86, belt 82, grooved wheels 80 and 84 together with threaded rod 76 and block 66 serve as a linear actuator to move the second pulley half F-2 laterally relative to first pulley half F-1. The means by which the motor 86 is electrically energized will be explained later in detail.

The base 10 has bracket means 86 of conventional structure secured thereto as may be seen in FIG. 1, which bracket means rotatably support a transversely disposed driven shaft 88. A driven pulley H is mounted on shaft 88 as shown in FIGS. 1 and 2, and is engaged by belt 14.

The driven pulley H includes a first half portion H-1 that is rigidly secured to driven shaft 88 by a key 90. Key 90 engages a longitudinal slot 92 in driven shaft 88 and a slot 94 formed on the interior of a cylindrical hub 96 that projects from first half H-1 as shown in FIG. 2. The driven pulley H includes a second half H-2 that has a cylindrical shell 98 projecting therefrom that is slidably mounted on a hub 96. A key 100 engages aligned longitudinal grooves 102 and maintains the first and second halves H-1 and H-2 in non-rotatable relationship relative to one another as shown in FIG. 2.

A compressed helical spring 104 encircles hub 98 and is in abutting contact with second half H-2 and a retainer 106 that is held in a fixed position relative to driven shaft 88 by a resilient clip 108. The clip 108 engages a circumferential groove 110 formed in the free end portion of hub 96 as may be seen in FIG. 2.

When the second half F-2 moves transversely relative to the second half F-1, the tension and lateral force exerted by the belt 14 is varied to overcome the force exerted by the spring 104, with the effective pitch diameter ratio between the driving pulley F and driven pulley H varying between the extremes shown in FIG. 5. It will be particularly noted that the portions of the driving and driven pulleys F and H engaged by belt 14 at all times remain axially aligned for as shown in FIG. 6, when the belt 14 moves from a position shown in solid line to one shown in phantom line the lateral shifting of the second movable halves F-2 and H-2 is in the same direction. Thus, there is no tendency for belt 14 to become disengaged from the driving and driven pulleys as the effective pitch ratios thereof is varied.

Referring to FIG. 1 a grooved wheel 18 (such as shown in FIG. 2) engages an endless belt 112 that drives a grooved wheel 114 secured to a rotatable shaft 116 of an electrical generator 118. The generator 118 is secured to a bracket 120 that is affixed to the engine C by conventional means such as bolts 122 or the like. Driven shaft 88 as may be seen in FIG. 1 has a power take off sprocket 124 mounted thereon that is engaged by a link belt 126 that delivers rotational power from engine C to a desired source.

The torque curve J of engine C is shown in FIG. 8 in solid line. The torque that is desired to be delivered by the driven shaft 88 from engine C through transmission D by varying the pitch diameter ratios of the driving and driven pulleys F and H is indicated by the torque curve K in FIG. 1.

Horsepower is a product of torque and rotation speed, and the horsepower at any given r.p.m. will vary directly with the torque. By selectively varying the pitch diameter ratios of the driving and driven pulleys F and H the torque curve K in the region thereof between 5500 and 10,500 r.p.m. as shown in FIG. 8 can be made substantially flat.

The transmission D in combination with the automatic sensing device L now to be described permits the power output on the driven shaft 88 to follow the torque cruve J to a desired degree, and obtain usable power at the driven shaft in a more efficient manner than by manually varying the pitch diameter ratios of the driving and driven pulleys F and H.

A sheet M of pliable material, such as paper or the like is provided that has a number of strips M-1 to M-4 inclusive defined thereon. Each strip M-1 to M-4 has a sequence of triangular shaped light deflecting areas N-1, N-2, N-3 and N-4 defined thereon and these areas being separated by dark non-light reflecting triangular areas 0-1, 0-2, 0-3 and 0-4. The triangular areas N-1 to N-4 and 0-1 and 0-4 are of different configuration and widths for reasons that will later be explained.

One of the strips M-1 to M-4 has light reflecting and non-light reflecting areas of an appropriate configuration for engine C and is mounted on the hub 26 as shown in FIG. 2 to encircle the same.

The desired strip M-1 to M-4 is removably held in the encircling position on hub 26 by conventional means (not shown) such as an adhesive or the like.

A source of electric energy is provided, such as a storage battery (not shown) which is charged when engine C is operating by the generator 118. Electric energy is delivered from generator 118 to the source through conductors 130 shown in FIG. 1. The source of electric energy supplies electric power V to a number of terminals that are identified in FIG. 9 by the letter P.

A light emitting diode 132 is provided that directs a beam of light 134 on the strip M-1 as it rotates with hub 26 as shown in FIG. 9. The diode 132 is supported by a bracket 136 from shell 62 as shown in FIG. 2. A beam of light 134' is reflected from the areas N-1 as they rotate to a transistor U that is electrically conductive only when the beam impinges thereon.

One terminal of light emitting diode 132 is connected to a terminal P by a conductor Q and the other terminal by a conductor R to ground S. A preamplifier 138, Schmidt trigger 140, monostable multivibrator 142 and low pass filter 144 are connected by conductor 146, 148 and 150 as shown in FIG. 9. Transistor U, preamplifier 138, Schmidt trigger 140, monostable multivibrator 142 and low pass filter 144 each have one terminal P and the other terminal by a conductor R to ground S.

The beam of light 134' is intermittent and as it intermittently renders transistor U electrically conductive causes the latter to deliver a pulsating voltage V to preamplifier 138. The frequency of the pulses of voltage V is related to the rate of rotation of the driving pulley F, and the time duration of each pulse is related to the time it takes for each light reflecting area N-1 to rotate past the beam 134. The time it takes for each light reflecting area N-1 to rotate past the beam 134 is related to the position of the second half F-2 of driving pulley F relative to the first half F-1 thereof, for the light reflecting areas N-1 move laterally concurrently with the second half.

The pattern of the voltage V as it is altered by the elements 138, 140, 142 and 144 is shown plotted against magnitude and time in small graphs adjacent the elements in FIG. 9, and the low pass filter delivering a relatively constant voltage B that in magnitude is related to the rate at which the driving pulley F rotates. Voltage B is delivered to a conductor 148.

A second low pass filter 154, inverter 156, summer 158 and power buffer 160 are connected by conductors 162, 164 and 166 as shown in FIG. 9, with each of the above identified elements being connected to terminals P and ground S by conductors Q and R.

Conductor 148 has a junction point 148a therein from which a conductor 162 delivers electric energy in the squared voltage pattern V' to the second low pass filter 154. Inverter 156 delivers a voltage A to summer 158 that is related to the time it takes for a light reflecting area N-1 to move past beam 134 which in turn is related to the transverse positioning of the second half F-2 of driving pulley F relative to the first half thereof.

Power buffer 160 has a conductor 168 extending therefrom to a linear actuator X which when actuated is capable of transversely moving second half F-2 of driving pulley F relative to first half F-1 to vary the pitch diameter of the driving pulley. The linear actuator X may be either the first form X-1 thereof shown in FIG. 2 or a second form X-2 illustrated in FIG. 7 and later to be described.

The voltages A and B due to inverter 156 are of different polarities. When voltages A and B are equal they cancel one another and power buffer 160 is not actuated to energize the linear actuator X. The motive power in actuator X-1 is the reversible motor 86. When voltages A and B are not equal power buffer 160 causes a flow of electric current to motor 86 through conductor 168 in a direction to cause the motor to rotate threaded rod 76 in a direction to vary the pitch diameter of the driving pulley F until A and B are again equal.

The width of the light reflecting areas N-1 is so chosen that the torque J of the driven shaft 88 will have a desired relationship to the torque K of engine C. For instance, the segment K-1 of torque curve K as shown in FIG. 8 may be so selected that the effective pitch diameter of driving and driven pulleys F and H is 8 to 1, while the segment K-2 may have a pitch diameter of 2 to 1. In all instances it is desirable that torque curve K be somewhat less than torque curve J to permit acceleration of the engine C.

From the foregoing discussion, it is apparent to one skilled in the art that an electric motor could be substituted for internal combustion engine and that any sensor or combination of sensors which sense the rotational speed of the prime mover and the position of the second half portion of the driving pulley can be substituted for the light beam sensor described herein without departing from the spirit and scope of the present invention. Within this class of sensors or combinations of sensors falls such devices as magnetic sensors, pneumatic sensors, hydraulic sensors and a sensor as simple as a cam follower coupled to the wiper of a linear resistor.

In FIG. 7 a second form of the invention is shown in which the second form X-2 of the linear actuator is used. Elements in the second form of the invention that are common to the first form are identified in FIG. 7 by the same numerals and letters previously used but with primes being added thereto.

In the second form of the invention as shown in FIG. 7 plate 46' has a first hydraulic cylinder 200 extending outwardly therefrom in which a piston 202 is slidably mounted that has a recessed inner portion 204 on which the ball bearing assembly 72' is mounted, with one race of the assembly secured to hub 26'. Hydraulic fluid Y may be discharged into and out of first cylinder 200 through a passage 206.

Passage 206 is in communication with the outer interior portion of a second hydraulic cylinder 208 that projects from plate 46'. A second piston 210 is slidably mounted in second cylinder 208. Second piston 210 has a tapped cavity 212 therein that is engaged by a threaded shaft 214 that is driven by a reversible electric motor 216. Electric motor 216 rotates threaded shaft 214 when the motor is supplied with electric power through conductor 168 and a conductor R in the manner previously described in connection with the first form of the invention.

When the motor 216 is actuated by electric power received from power buffer 160, the threaded shaft 214 is rotated to move second piston 210, with hydraulic fluid Y being forced into first cylinder 200 to move first piston 202 and second pulley half F'-2 relative to the first pulley half F'-1 until the pitch ratios of the driving and driven pulleys F' and H' is such that voltages A and B are equal. The above described operation will continue intermittently as the load on driven shaft 88' varies, and as a result the torque delivered by driven shaft 88' will follow the curve K illustrated in FIG. 8. Spring 74' tends at all times to move second half F'-2 away from first half F'-1.

Figure 11:
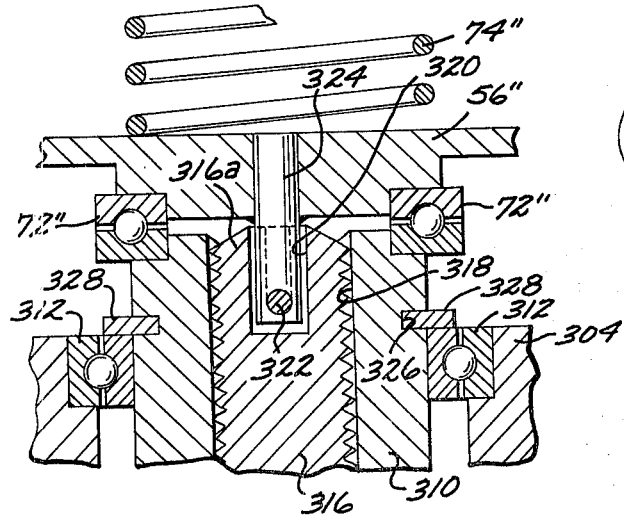
FIG. 11 is an enlarged fragmentary cross-sectional view of the third form of the invention.
Figure 12:
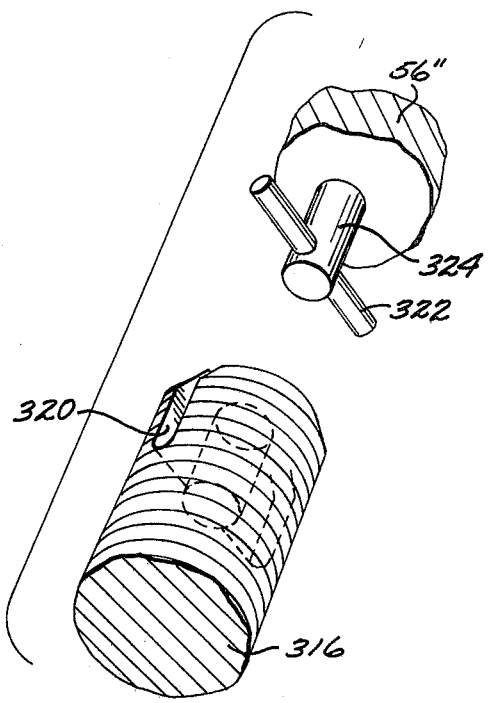
FIG. 12 is a perspective view of two of the components used in the third form of the invention.

In FIGS. 10 to 12 inclusive a third form of the invention is shown on which a third form X-3 of the linear actuator is used. Elements in the third form of the invention that are common to the first form are identified in FIGS. 10 to 12 by the same numerals and letters previously used but with double primes being added thereto.

In the third form of the invention as illustrated in FIGS. 10 to 12 a bracket 300 secured to first plate 46" by bolts 302 serves as a fixed mounting for the outer cylindrical portion 304 of a hysteresis brake 306. The hysteresis brake illustrated is manufactured commercially by the Delevand Division, American Precision Industries, Inc., East Aurora, New York and serves as the third form of linear actuator X-3.

Brake 306 has coils 308 in portion 304 that may be electrically energized through conductors 168, Q and R. Brake 306 has a rotatable inner portion 310. Inner portion 310 is rotatably supported in outer portion 304 by a pair of spaced ball bearing assemblies 312. The inner portion 310 has a nut 314 on the outer end thereof that engages a threaded rod 316 that extends through a longitudinal bore 318 in the inner portion. Threaded rod 316 on a first end 316a thereof has a slot 320 therein of rectangular transverse cross-section that is removably engaged by an elongate cross-number 322 that is secured to circular member 56" by a pin 324. Inner portion 310 has a circular recess 326 therein that is engaged by a snap ring 328 that bears against the ball bearing assembly 312 nearest to the circular member 56". Snap ring 32 limits the outward movement of inner portion 310 relative to outer portion 304 as may be seen in FIG. 10. Nut 314 is secured to inner portion 310 by conventional means (not shown).

When coils 308 are not electrically energized cross member 322 as it rotates causes concurrent rotation of inner portion 310, threaded rod 316 and nut 314 as a unit. Upon coils 308 being electrically energized by a signal received by the third form X-3 of the linear actuator through conductor 168 the inner portion 310 is stopped from rotating, but the threaded rod 316 continues to rotate relative to the inner portion and nut 314. Rotation of threaded rod 316 relative to inner portion 310 results in lateral movement of second half F"-2 to first half F"-1 of driving pulley F" to vary the effective pitch diameter thereof as previously described in connection with the first form of the invention.

The use and operation of the invention has been described previously in detail and need not be repeated.

Furthermore, it should be apparent that linear actuator X may be implemented in several other ways, such as, but not limited to a hydraulic or eddy current brake without departing from the spirit and scope of the invention.

Figure 13:
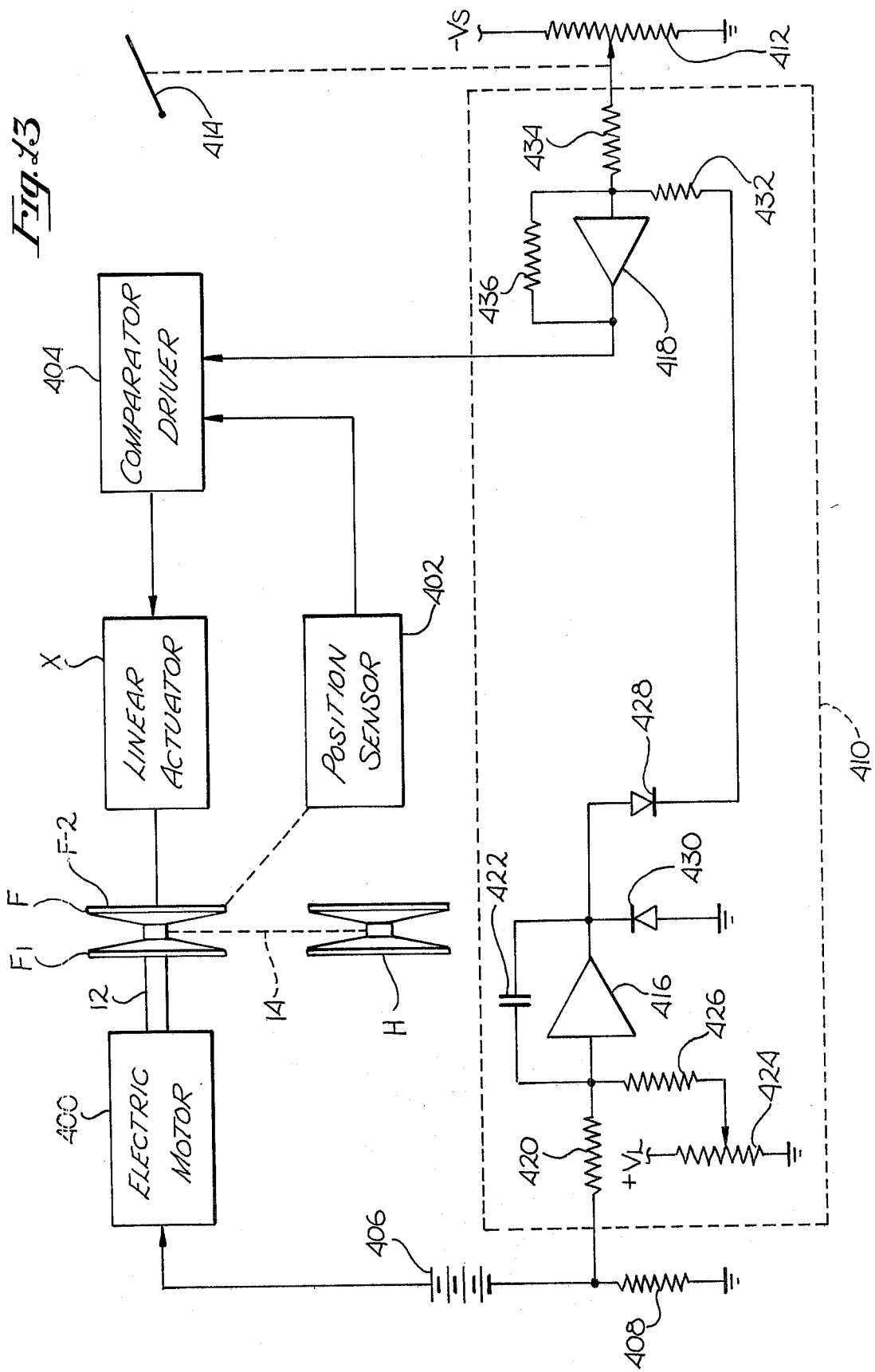
FIG. 13 is a block diagram of a second embodiment of the invention wherein the prime mover is a source of constant rotational speed.

Referring to FIG. 13, shown therein is another embodiment of the present invention. Elements in this embodiment of the present invention that are common to the other embodiments are identified in FIG. 14 by the same reference numerals.

Figure 14:
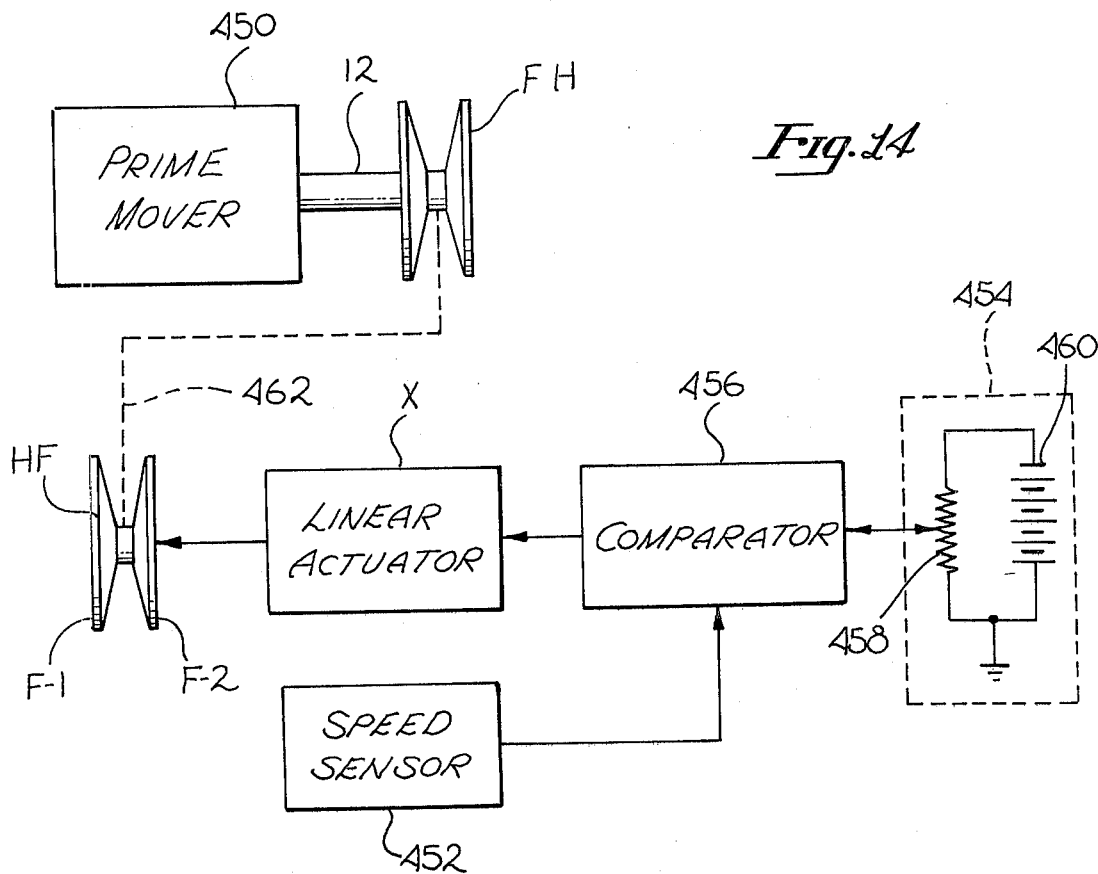
FIG. 14 is a third embodiment of the present invention wherein an output of constant rotational speed is desired.

Referring to FIG. 14, the embodiment shown therein includes a prime mover represented by electric motor 400 having a drive shaft 12. Driving pulley F which is substantially the same as the driving pulley F previously described is mounted on drive shaft 12. Driving pulley F is coupled to driven pulley H by V-belt 14. Driven pulley H is substantially the same as the driven pulley H previously described. Linear actuator X is substantially the same as X-1 through X-3 previously described is coupled to second pulley half F-2 of driving pulley F. Position sensor 402 senses the position of second pulley F-2 and the output of position sensor 402 is coupled to an input of comparator driver 404. The output of comparator driver circuit 404 is coupled to linear actuator X.

Electric motor 400 is powered by a source of direct current represented by battery 406. Resistor 408 is coupled between the negative terminal of battery 406 and ground. The terminal formed by the negative terminal of battery 406 and one end of resistor 408 is coupled to an input of voltage limiting circuit 410 and the output of voltage limiting circuit 410 is coupled to an input of comparator driver circuit 404.

Variable resistor 412 is coupled between a minus source of direct current voltage represented by a $-V_s$ and ground and the wiper of variable resistor 412 is coupled to an input of voltage limiting circuit 410. Pedal 414 is mechanically coupled to the wiper of variable resistor 412 such that depressing pedal 414 causes the wiper of variable resistor 412 to move such that the voltage between the wiper and ground increases in magnitude toward $-V_s$.

The voltage limiter circuit 410 comprises two operational amplifiers 416 and 418. Resistor 420 is coupled between the input of operational amplifier 416 and the connection formed by the negative terminal of battery 406 and one end of resistor 408. Capacitor 422 is coupled between the input and output of amplifier 416. Variable resistor 424 is coupled between a positive source of direct current voltage represented by $+V_L$ and ground. Resistor 426 is coupled between the wiper of variable resistor 424 and the input of operational amplifier 416. The anode of diode 428 and the cathode of diode 430 are coupled to the output of amplifier 416. The cathode of diode 428 and the anode of diode 430 are coupled respectively to one end of resistor 432 and ground. The other end of resistor 432 is connected to the input of operational amplifier 418. The two ends of resistor 434 are coupled between the input of amplifier 418 and the wiper of variable resistor 412 and resistor 436 is coupled between the input and output of amplifier 418. The output of amplifier 418 is coupled to an input of comparator driver circuit 404.

In practice, position sensor 402 can be substantially the same as automatic sensing device L. Also, comparator driver circuit 404 can be substantially the same as that portion of electronic circuit of FIG. 9 comprising the series connection of preamp 138, Schmidt trigger 140, low pass filter 154, inverter circuit 156, summer 158, and power buffer 160 except that the output of voltage limiter circuit 410 is applied to an input of summer 158 on conductor 152.

For the sake of illustration, assume that the output rotational speed of electric motor 400 is a constant and that the wiper contact of variable resistor 424 is set such that the voltage between the wiper contract and ground is some positive value corresponding to a predetermined maximum load condition. Further, assume that pedal 414 is in a position such that the resistance between the wiper arm of variable resistor 412 and ground is substantially 0 thereby making the input to amplifier 418 substantially 0 volts. If pedal 414 is depressed, the wiper arm of variable resistor 412 is moved such that the voltage increases in a negative direction from 0 toward $-V_s$ thereby causing the voltage at the input of operational amplifier 418 to increase in the negative direction. As the input voltage of amplifier 418 increases in the negative direction the output voltage of amplifier 418 increases in the positive direction and is coupled to the input of comparator driver circuit 404. Comparator driver circuit 404 compares the signal from position sensor 402 with the output of amplifier 418 and if there is a difference applies a signal to linear actuator X to move second pulley half F-2 relative to first pulley half F-1 until the difference between the two signals is substantially 0. Accordingly, the effective pitch diameter ratio between the driving and driven pulley is varied and the load on electric motor 400 increases.

As the load on electric motor 400 increases, the current supplied to electric motor 400 by battery 406 increases thereby increasing the voltage drop across resistor 408 in a negative direction. So long as the voltage drop across resistor 408 is smaller in magnitude than the positive voltage set by variable resistor 424, the output voltage of the integrator formed by amplifier 416 and feedback capacitor 422 increases in a negative direction. So long as the output voltage of amplifier 416 is a negative, diode 428 is reverse biased effectively isolating the input of amplifier 418 from the output of amplifier 416. Accordingly, so long as the output of amplifier 416 is negative, the output of amplifier 418 will vary directly in proportion to movement of pedal 414. To prevent the output of amplifier 416 from becoming too negative, diode 430 coupled between the output and ground holds the output voltage at a minus one diode drop.

When the load current through resistor 408 reaches a point such that the voltage drop across resistor 408 becomes greater than the voltage set on variable resistor 424, the input voltage on amplifier 416 becomes increasingly more negative thereby causing the output of amplifier 416 to integrate toward a positive voltage. The increasing positive voltage at the output of amplifier 416 is reflected at the input of amplifier 418 where it is additively combined with the negative voltage corresponding to the voltage drop between the wiper of variable resistor 412 and ground. Accordingly, the negative voltage appearing at the input of amplifier 418 ceases to continue to increase in the negative direction and the output voltage of amplifier 418 ceases to increase in the positive direction as pedal 414 is depressed. Furthermore, so long as the load on electric motor 400 is in excess of some preselected value, the output voltage of amplifier 418 will decrease, thereby causing linear actuator X to move the second pulley half F-2 relative to first pulley half F-1 to reduce the load on electric motor 400 thereby reducing the voltage drop across resistor 408 until the drop across resistor 408 equals the voltage preset on variable resistor 424. When the voltage across resistor 408 and the voltage preset on variable resistor 424 are equal, the input voltage on amplifier 426 is substantially 0 and the integrator formed by amplifier 416 and capacitor 422 will cease to integrate up in a positive direction and hold the output voltage at some constant positive value. Similarly, if the load on electric motor 400 drops below the present load, the output voltage of amplifier 416 will integrate downward until it becomes a negative value again thereby allowing the output of amplifier 418 to be directly responsive to movements in pedal 414.

As previously stated, it should be apparent to one skilled in the art that the function of position sensor 402 can be performed by several different types of sensors without departing from the spirit and scope of the invention. Furthermore, the description of circuits which will perform the comparator function and the voltage limiting function are meant to be purely illustrative and not determinative of the invention. Also, the load on electric motor 400 can be sensed by any number of current sensors available in the art.

Referring to FIG. 14, shown therein is another embodiment of the present invention. Elements in this embodiment of the present invention that are common to the other embodiments are identified in FIG. 14 by the same reference numerals.

Referring to FIG. 14, the embodiment shown therein includes a prime mover 450 having a drive shaft 12. Driving pulley FH which is substantially the same as the driven pulley H previously described is mounted on drive shaft 12. Driving pulley FH is coupled to driven pulley HF by V-belt 462. Driven pulley HF is substantially the same as the driving pulley F previously described. Linear actuator X substantially the same as the linear actuators $X_1$ through $X_3$ previously described is coupled to second pulley half $F_2$ of driven pulley HF. Speed sensor 452 is coupled to driven pulley HF and the output of speed sensor 452 is coupled to an input of comparator circuit 456. Reference level source 454 is coupled to another input of comparator circuit 456 and the output of comparator circuit 456 is coupled to the input of linear actuator X.

Figure 15:
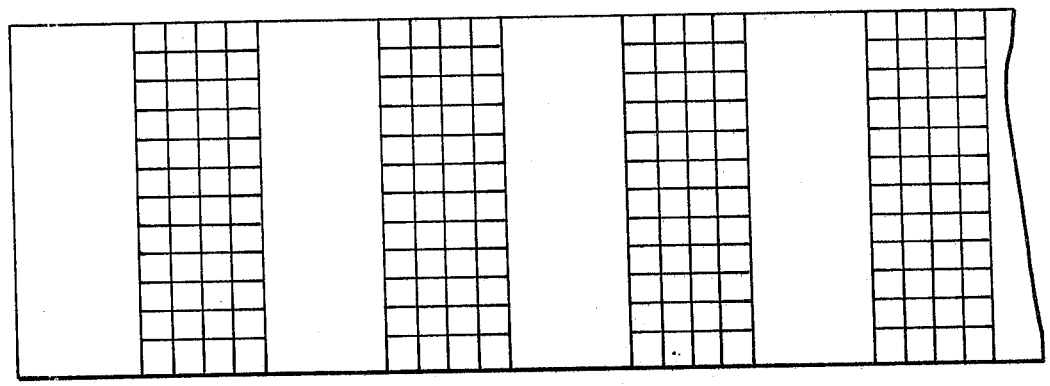
FIG. 15 is a top plan view of a sheet having a pattern of light reflecting strips defined thereon.

In practice, speed sensor 452 can be substantially the same as automatic sensind device L except that the dark nonreflecting areas may be of constant longitudinal width as shown in FIG. 15 instead of being triangular. It is understood that the particular pattern shown is a simplified schematic form and other forms and shapes may be desirable. Also, comparator circuit 456 can be substantially the same as that portion of the electronic circuit of FIG. 9 comprising the series connection of preamp 138, Schmidt trigger 140, monostable multivibrator 142, low pass filter 144, summer 158 and power buffer 160 except that reference level 454 is applied to the summer on conductor 164. Furthermore, the reference level 454 can comprise a source of direct current voltage represented by battery 460 coupled to a rheostat 458.

In operation, driving shaft 12 is rotated by prime mover 450. For the sake of illustration assume that the output rotational speed of prime mover 450 is not a constant and varies over some range. The varying rotational rate of prime mover 450 is transmitted via shaft 12, driving pulley FH and V-belt 462 to driven pulley HF. The rotational speed of driven pulley HF is sensed by speed sensor 452 which generates an output to comparator circuit 456. Comparator circuit 456 compares the output from speed sensor 452 with a reference level 454. If the output from speed sensor 452 and the reference level are not equal, comparator circuit 456 delivers an output to energize actuator X to move the second half F-2 of driven pulley HF to vary the effective pitch diameter ratios of the driving and driven pulleys at FH and HF until the output of speed sensor 452 and the reference level are equal. Accordingly, so long as the output from speed sensor 452 and the reference level 454 are equal, the speed of rotation of driven pulley HF is a constant irregardless of the changes in rotational speed of the driving pulley FH.

Figure 16:
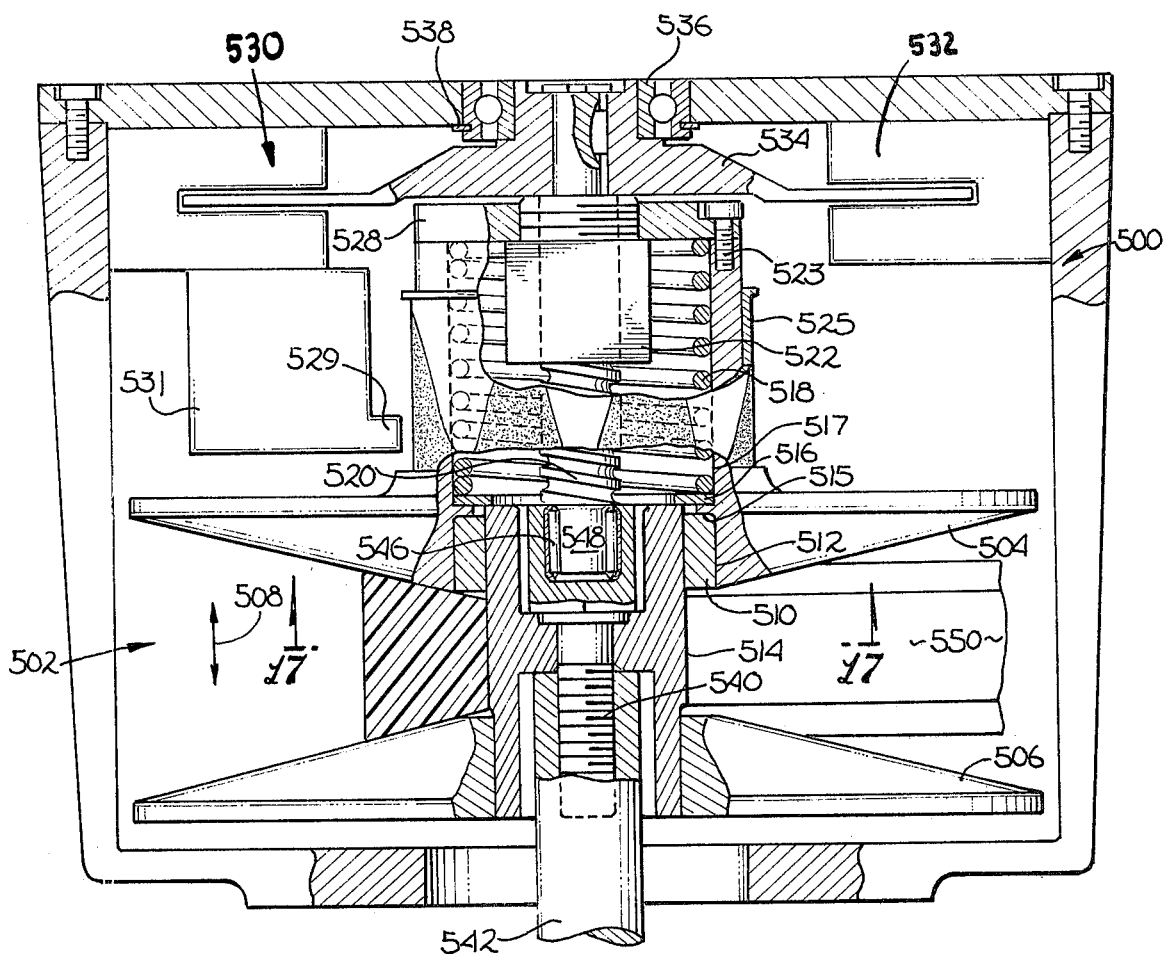
FIG. 16 is a cross-sectional schematic view of one embodiment of a linear actuator.
Figure 17:
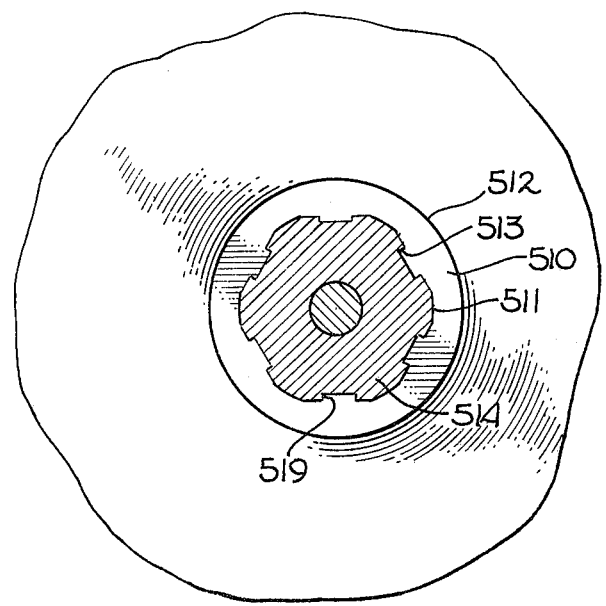
FIG. 17 is a simplified view taken along the lines 17—17 of FIG. 16.

A specific embodiment of the linear actuator that may be employed with the system of FIG. 9 is shown in FIGS. 16 and 17 showing a housing 500 which encloses the pulley 502 comprising a movable pulley half 504 and a fixed pulley half 506. The fixed pulley half 506 is mounted to be driven directly by the output 542 of the prime mover (e.g., output of the internal combustion engine, electric motor, etc.). The fixed pulley half 506 is thus fixed longitudinally with respect to movable pulley half 504 which is adapted to slide longitudinally (arrows 508) with respect to fixed pulley half 506. The fixed pulley half 506 contains a bearing insert 510 fixedly secured in an opening 512 in movable pulley half 504. The bearing 510 has a configuration as shown in FIG. 17 comprising a plurality of splinelike members which slidingly engage a mating hub 514, which hub portion has a matching male cross-section to matchingly engage the bearing 510. Thus, it can be seen that the movable pulley half 504 is free to slide in the direction of arrows 508 via bearing 510 on the mating spline members 514 of the fixed half of the pulley 506.

The movable pulley half 504 has an internal lip 515 against which the bearing 510 abuts. The lip 515 also receives a washer 516 which washer is adapted to slidingly fit within the bore 517 of movable pulley half 504. The washer 516 extends beyond lip 515 to engage the end of bearing 514 in fixed pulley half 506. The coil spring 518 abuts the surface of the washer 516 and extends from the washer 516 to plate 528 which is secured to one end of the movable pulley half 504 by fastening means 523. It can be seen that movement of the movable pulley half 504 in the direction of arrows 508 toward the fixed pulley half 506 will result in the spring 518 being compressed between washer 516 (fixed by the end of spline 514) and plate 528 (which moves with movable pulley half 504).

The plate 528 has fixed therein a circulating ballnut 522 which is a standard commercially available component. The ballnut 522 receives lead screw 520 which is secured to disc 534 which in turn is rotatably mounted in rotary bearing 536 by fastening means 538 (schematically shown). The lead screw 520 is also rotatably mounted at its end 548 in an opening 546 in the end of fastening means 540. The fastening means 540 secures the fixed half of the pulley 506 of the prime mover output shaft as schematically indicated as 542. Thus, it can be seen that lead screw 520 is mounted for rotation so that it can rotate at the same speed as ballnut 522 and movable pulley half 504 which rotate as a unit or lead screw 520 may rotate at a different speed with respect to said ballnut and movable pulley half 504. When a differential in speed exists between the lead screw and the movable half of pulley 504, the ballnut will be displaced along the lead screw resulting in the movement of movable half pulley 504 and the compression of spring 518.

The disc 534 which is secured to lead screw 520 forms part of an eddy current brake 530. The eddy current brake includes a plurality of coils 532 spaced around disc 534. Thus, the coils of eddy current brake 530 may be energized to effect the force supplied to the disc 534 which in turn places a variable force on the lead screw that determines the speed of the lead screw with respect to ballnut 522.

A light and dark area sleeve 525 is mounted on the movable pulley half 504 and fixed thereon by snap ring 526. The light and dark area sleeve has been previously described in connection with FIGS. 4 and 9. The light and dark areas on sleeve 525 cooperate with light sensor 529 and electronic assembly 531 to provide position and RPM information as to movable pulley half 504.

In summary, the above described linear actuator operates to change the pitch of the pulley by movement of the movable pulley half 504 with respect to the fixed half 506. This movement is accomplished by the relative speed of the lead screw 520 with respect to the ballnut 522 and movable pulley half 504 which rotates as a unit. The speed of the lead screw is determined by the eddy current brake 530 as controlled by the electronics hereinabove explained with the speed and positional information of the movable half 504 determined by the light sensor 529 and electronics 531 as explained in detail above.

One additional specific novel aspect of the above-described embodiment is the configuration of the spline 514 and the mating bearing 510 shown in detail in FIG. 17. It should be noted that the portions 511 of spline shaft 514 contact the belt 550. The configuration of portions 511 are such as to cause minimum wear of the belt 550. In addition, these spline members contact and drive the bearing of movable half 504 of the pulley. The depth of grooves 513 are less than three-eights of an inch and preferably the wall 519 is approximately one-quarter of an inch. This minimizes metal removal while maintaining the strength of the shaft and bearing. Both the configuration and the fact that there are pluralities of such spline members enables the movable half 504 to be efficiently and effectively drive by spline 514. Thus, the spline and bearing members present an additional novel aspect of this invention.

In all cases, it is understood that the above-described embodiments are merely illustrative of but a small number of the many possible specific embodiments which can represent application of the principles of the present invention. Numerous and varied other arrangements can be readily devised in accordance with these principles by those skilled in the art without departing from the spirit and scope of the invention.

I claim:

1. A power drive assembly comprising:
   an endless V-belt;
   a rotatably supported first shaft;
   a rotatably supported second shaft spaced from said first shaft and parallel thereto;
   a first pulley defined by first and second halves, said first half being rigidly secured to said first shaft and said second half being slideably mounted on said first shaft but nonrotatable relative thereto;
   a second pulley defined by first and second halves, said first half of said second pulley rigidly secured to said second shaft, and said second half of said second pulley slideably mounted on said second shaft and slideably nonrotatable relative thereto;
   force exerting means that tends to maintain said second half of said second pulley in a position relative to said first half thereof such that the effective pitch diameter of said second pulley is a maximum;
   spring means that tends to move said second half of said first pulley to a predetermined maximum spacing relative to said first half thereof;
   a first means operatively associated with said spring means for moving said second half of said first pulley relative to said first half thereof when said first means is energized; and
   a second means for energizing said first means in accordance with a predetermined relationship thereby varying the effective pitch diameter ratio of said first pulley and said second pulley relative to said V-belt, said second means comprising:
   third means for sensing the rotational speed of said first shaft, said third means generating a first output whose magnitude is related to said rotational speed;
   fourth means for sensing the relative position of said second half of said first pulley to said first half, said fourth means generating a second output whose magnitude is related to said relative position; and
   fifth means for comparing the difference in the magnitude of said first output and second output and generating a third output to energize said first means to move said second half relative to said first half to vary the effective pitch diameters of said first and second pulley until said first and second outputs are equal.

2. An assembly as defined in claim 1 in which said first means comprises:
   A reversible electric motor that is actuated when it receives said third output from said fifth means;
   a rotatably supported threaded rod that is rotated by said motor;
   sixth means that threadably engage said threaded rod and move longitudinally relative thereto as said threaded rod rotates; and
   seventh means for transmitting said longitudinal movement of said fifth means to said second half of said first pulley to vary the pitch diameter of the latter.

3. An assembly as defined in claim 2 in which said fifth means is a rigid block that has a taped bore therein that engages said threaded rod.

4. An assembly as definded in claim 3 in which said seventh means is a thrust bearing having first and second independently rotatable portions that transfer longitudinal movement of said block relative to said threaded rod to said second half of said first pulley.

5. In combination with a prime mover having a driving shaft to which rotation of power is transmitted by said prime mover in accordance with a predetermined torque curve inherent to said prime mover, a power drive assembly operatively associated with said prime mover for delivering rotational power output that is related to said torque curve, which assembly comprises:
   an endless V-belt;
   a rotatably supported driven shaft spaced from said driving shaft and parallel thereto;
   a driving pulley defined by first and second halves, with said first half being rigidly secured to said driving shaft, and said second half being slidably mounted on said driving shaft, but nonrotatable relative thereto;
   a driven pulley defined by first and second halves, said first half of said pulley rigidly secured to said driven shaft, and said second half of said driven pulley slidably mounted on said driven shaft and substantially nonrotatable relative thereto;
   force exerting means that tends to so maintain said second half of said driven pulley in a position relative to said first half thereof that the effective pitch diameter of said driven pulley is a maximum;
   spring means that tends to move said second half of said driving pulley to a predetermined maximum spacing relative to said first half thereof;
   first means operatively associated with said spring means for moving said second half of said driving pulley relative to said first half thereof when said first means is energized;
   second means for sensing the rotational speed of said driving shaft, said second means generating a first output whose magnitude is related to said rotational speed;
   third means for sensing the relative position of said second half of said driving pulley to said first half, said third means generating a second output whose magnitude is related to said relative position; and
   fourth means for comparing the difference in the magnitudes of said first output and said second output and generating a third output to energize said first means to move said second half of said driving pulley relative to said first half to vary the effective pitch diameters of said driving and driven pulleys until said first and second outputs are equal whereupon said prime mover operates in a desired relation to said torque curve in delivering torque to said driven pulley.

6. A power drive assembly according to claim 5 wherein said second, third and fourth means comprise:
   endless surface defining means that occupy a fixed position relative to said second half of said driving pulley and rotate concurrently therewith;
   a plurality of circumferentially spaced, elongate light reflecting areas defined on said endless surface defining means, with each of said areas varying longitudinally in width;

means for directing a stationery, continuous first beam of light onto said areas to be reflected therefrom as a second beam of intermittent pulses which vary in frequency and duration in accordance with the speed of rotation of said driving pulley and the position of said areas longitudinally relative to said first beam;

a source of electric power; and an electronic circuit energized by said source of electric power, which circuit includes a phototransistor on which said second beam impinges to render the same conductive, with said circuit including first and second portions that receive pulses of electric energy from said phototransistor and transform the same into first and second voltages that correspond in magnitude to the rate at which said areas move past said first beam of light and the duration of time of each of said pulses of said second beam of light, with said circuit also including first means for comparing the difference in magnitude between said first and second voltages, and second means responsive to said difference for energizing said first means to move said second half of said driving pulley relative to said first half to vary the effective pitch diameters of said driving and driven pulleys until said first and second voltages are equal whereupon said prime mover operates in a desired relationship to said torque curve in delivering torque to said driven pulley.

7. An assembly as defined in claim 6 in which said force exerting means is a compression helical spring that encircles said driven shaft, with said spring having first and second ends, with said first end being in a fixed position relative to said shaft and said second end being in force exerting contact with said second half of said driven pulley.

8. An assembly as defined in claim 7 in which said endless surface defining means is cylindrical in shape and said light reflecting areas defined therein are generally triangular in configuration.

9. An assembly as defined in claim 6 in which said first means comprises:
a reversible electric motor that is actuated when it receives electric power from said second portions of said electric circuit;
a rotatably supported threaded rod that is rotated by said motor;
fifth means that threadably engage said threaded rod and move longitudinally relative thereto as said threaded rod rotates; and
sixth means for transmitting said longitudinal movement of said fifth means to said second half of said driving pulley to vary the pitch diameter of the latter.

10. An assembly as defined in claim 9 in which said fifth means is a rigid block that has a tapped bore therein that engages said threaded rod.

11. An assembly as defined in claim 10 in which said sixth means is a thrust bearing having first and second independently rotatable portions that transfer longitudinal movement of said block relative to said threaded rod to said second half of said driving pulley.

12. An assembly as defined in claim 6 in which said first portion of said electric circuit includes a preamplifier, a Schmidt trigger, a monostable multivibrator and a low pass filter in series with said first voltage flowing to said first means.

13. An assembly as defined in claim 6 in which said second portion of said electric circuit includes a low pass filter, an inverter and summer that are connected in a series with said low pass filter being connected to the output of such Schmidt trigger, and said second portion delivering said second voltage to said first means.

14. An assembly as defined in claim 6 in which said first means comprises:
a reversible electric motor;
a threaded rod rotated by said motor;
first and second hydraulic fluid containing cylinders that occupy fixed positions relative to said engine, said cylinder including first end portions connected by a fluid passageway;
first and second pistons slidably and sealably mounted in said first and second cylinders with said second piston having a tapped bore therein that threadably engages with said threaded rod; and
bearing means disposed between said first piston and said second half of said driving pulley for moving said second half of said driving pulley relative to said first half thereof to vary the pitch diameter of said driving pulley when hydraulic fluid flows into and out of said cylinder through said fluid passage due to said electric motor being energized to move said said second piston in said cylinder to vary the quantity of said hydraulic fluid in said first cylinder.

15. An assembly as defined in claim 6 in which said first means comprises:
a threaded rod that extends outwardly from said second half of said driving pulley and rotates concurrently therewith;
a hysteresis brake that includes a stationary outer portion containing electrical coils and an inner portion that rotates freely relative to said outer portion except when said coils are electrically energized, said inner portion having a longitudinal bore therein through which said threaded rod extends; and
a nut on said inner portion that is longitudinally aligned with said bore and engaged by said rod, with said rod rotating relative to said nut when said coils are energized to stop the rotation of said inner portion, and said second half of said driving pulley being moved laterally relative to said first half as a result thereof.

16. An assembly as in claim 6 in which said prime mover comprises an internal combustion engine.

17. In combination with an internal combustion engine having a driving shaft to which rotational power is transmitted by said engine in accordance with a predetermined torque curve inherent to said engine, a power drive assembly operatively associated with said engine for delivering a rotational power output that is related to said torque curve, which assembly includes:
an endless V-belt;
a rotatably supported driven shaft spaced from said driving shaft and parallel thereto;
a driving pulley defined by first and second halves, with said first half being rigidly secured to said driving shaft, and said second half being slidably mounted on said driving shaft but non-rotatable relative thereto;
a driven pulley defined by first and second halves, said first half of said driven pulley rigidly secured to said driven shaft, and said second half of said driven pulley slidably mounted on said driven shaft and substantially non-rotatable relative thereto;

force-exerting means that tends to so maintain said second half of said driven pulley in a position relative to said first half thereof that the effective pitch diameter of said driven pulley is maximum;

spring means that tends to move said second half of said driving pulley to a predetermined maximum spacing relative to said first half thereof;

endless surface-defining means that occupy a fixed position relative to said second half of said driving pulley and rotate concurrently therewith;

a plurality of circumferentially spaced, elongate light-reflecting areas defined on said endless surface defining means, with each of said areas varying longitudinally in width;

means for directing a continuous first beam of light onto said areas to be reflected therefrom as a second beam of intermittent pulses which vary in frequency and duration in accordance with the speed of rotation of said driving pulley and the position of said areas longitudinally relative to said first beam;

a source of electric power;

electric power-operated means operatively associated with said spring means for moving said second half of said driving pulley relative to said first half thereof when said power operated means is electrically energized to vary the effective pitch diameter of said driving pulley, and the effective pitch diameter of said driven pulley varying in response to variation of the tension on said belt as the effective pitch diameter of said driving pulley varies; and an electronic circuit energized by said source of electric power, which circuit includes a phototransistor on which said second beam impinges to render the same conductive, with said circuit including first and second portions that receive pulses of electric energy from said phototransistor and transform the same into first and second voltages that correspond in magnitude to the rate at which said areas move past said first beam of light and the duration of time of each of said pulses of said second beam of light, with said circuit also including first means for comparing the difference in magnitude between said first and second voltages, and second means responsive to said difference for delivering electric power to said electric power-operated means to move said second half relative to said first half to vary the effective pitch diameters of said driving and driven pulley until said first and second voltages are equal whereupon said engine operates in a desired relationship to said torque curve in delivering torque to said driven pulley.

18. An assembly as defined in claim 17 in which said force-exerting means is a compressed helical spring that encircles said driven shaft, with said spring having first and second ends, with said first end being in a fixed position relative to said shaft and said second end being in force-exerting contact with said half of said driven pulley.

19. An assembly as defined in claim 17 in which said endless surface defining means is cylindrical in shape and said light reflecting areas defined thereon are generally triangular in configuration.

20. An assembly as defined in claim 17 in which said surface-defining means is an endless flat band and said light reflecting areas defined thereon are generally triangular in configuration.

21. An assembly as defined in claim 17 in which said power operated means includes:

a reversible electric motor that is actuated when it receives electric power from said second means;

a rotatably supported threaded rod that is rotated by said motor;

third means that threadably engage said threaded rod and move longitudinally relative thereto as said threaded rod rotates; and fourth means for transmitting said longitudinal movement of said third means to said second half of said driving pulley to vary the pitch diameter of the latter.

22. An assembly as defined in claim 21 in which said third means is a rigid block that has a tapped bore therein that engages said threaded rod.

23. An assembly as defined in claim 21 in which said fourth means is a bearing having first and second independently rotatable portions that transfer longitudinal movement of said block relative to said threaded rod to said second half of said driving pulley.

24. An assembly as defined in claim 17 in which said first portion of said electric circuit includes a preamplifier, a Schmidt trigger, monostable multivibrator and a low pass filter in series, with said first voltage flowing to said first means.

25. An assembly as defined in claim 17 in which said second portion includes a low pass filter, an inverter and a summer that are connected in series with said low pass filter being connected to the output of said Schmidt trigger, and said second portion delivering said second voltage to said first means.

26. An assembly as defined in claim 17 in which said power operated means includes:

a reversible electric motor;

a threaded rod rotated by said motor;

first and second hydraulic fluid containing cylinders that occupy fixed positions relative to said engine, said cylinder including first end portions connected by a fluid passage;

first and second pistons slidably and sealingly mounted in said first and second cylinders with said second piston having a tapped bore therein that threadably engages said threaded rod; and bearing means disposed between said first piston and said second half of said driving pulley for moving said second half of said driving pulley relative to said first half thereof to vary the pitch diameter of said driving pulley when hydraulic fluid flows into and out of said cylinder through said fluid passage due to said electric motor being energized to move said second piston in said cylinder to vary the quantity of said hydraulic fluid in said first cylinder.

27. An assembly as defined in claim 17 in which said electric power operated means includes:

a threaded rod that extends outwardly from said second half of said driving pulley and rotates concurrently therewith;

a hysteresis brake that includes a stationary outer portion containing electrical coils and an inner portion that rotates freely relative to said outer portion except when said coils are electrically energized, said inner portion having a longitudinal bore therein through which said threaded rod extends; and a nut on said inner portion that is longitudinally aligned with said bore and engaged by said rod, with said rod rotating relative to said nut when said coils are energized to stop the rotation of said inner portion, and said second half of said driving pulley being moved laterally relative to said first half as a result thereof.

* * * * *

UNITED STATES PATENT AND TRADEMARK OFFICE
CERTIFICATE OF CORRECTION

PATENT NO. : 4,088,036
DATED : May 9, 1978
INVENTOR(S) : Darrel D. Hillman

It is certified that error appears in the above-identified patent and that said Letters Patent are hereby corrected as shown below:

Please amend the application to indicate that the application is a Continuation-in-Part of application Serial No. 525,450 filed November 20, 1974, now abandoned.

Signed and Sealed this

Twenty-third Day of October 1979

[SEAL]

Attest:

RUTH C. MASON
Attesting Officer

LUTRELLE F. PARKER
Acting Commissioner of Patents and Trademarks